Feb. 24, 1970   J. L. RUSSELL   3,497,544
OXIDATION OF HYDROCARBON IN THE PRESENCE OF BORIC ACID
Filed Jan. 27, 1967
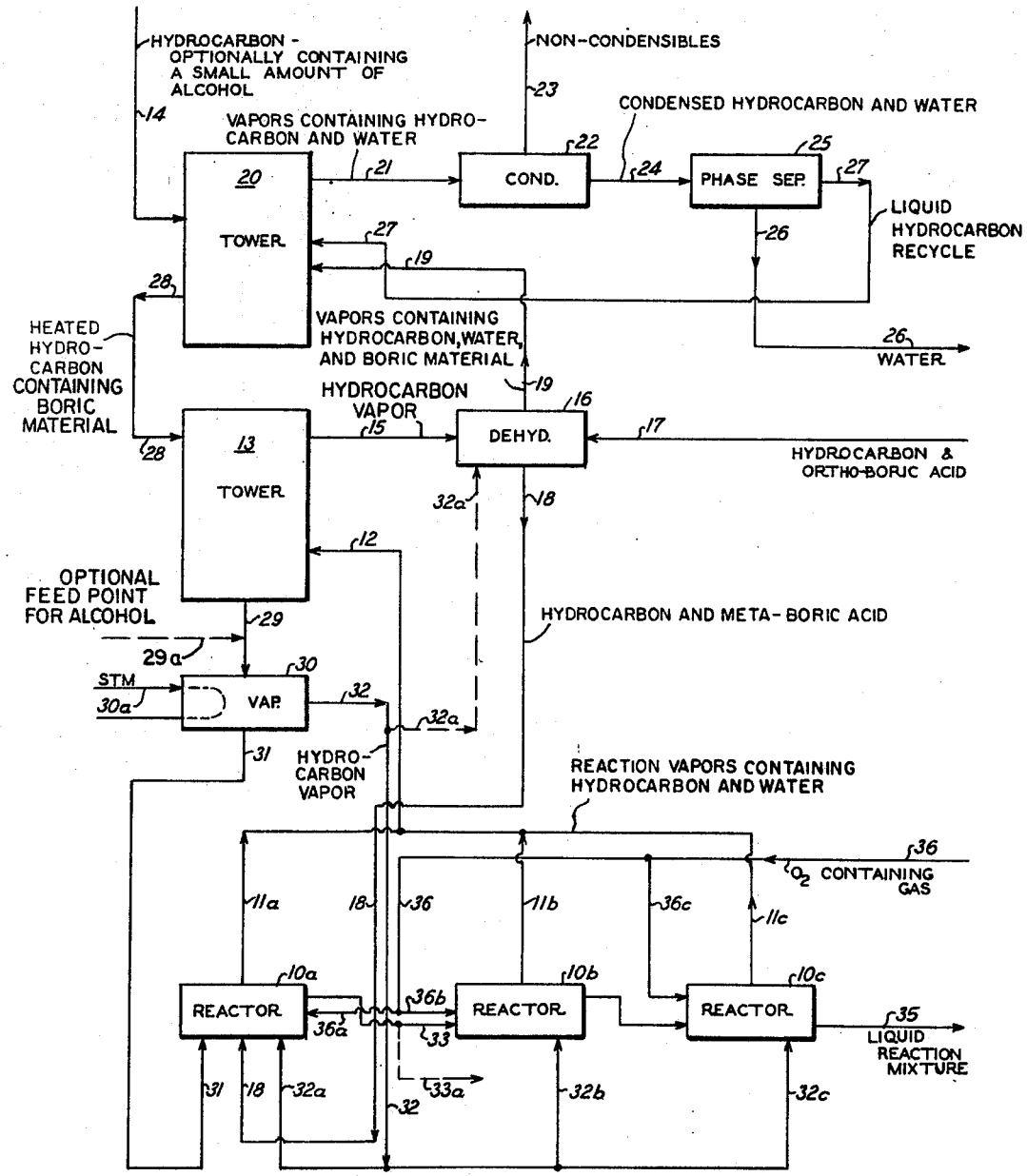
INVENTOR
JOSEPH L. RUSSELL
BY
William C. Long
ATTORNEY 3,497,544
OXIDATION OF HYDROCARBON IN THE
PRESENCE OF BORIC ACID
Joseph L. Russell, Ridgewood, N.J., assignor to Halcon International, Inc., a corporation of Delaware
Continuation-in-part of application Ser. No. 357,223, Apr. 3, 1964. This application Jan. 27, 1967, Ser. No. 612,259
Int. Cl. C07c 27/12, 27/26
U.S. Cl. 260—462                    10 Claims

ABSTRACT OF THE DISCLOSURE

Method for preventing deposition on heated surfaces of boron-containing material in a mixture of liquid cycloalkane and a boric acid at elevated temperatures by adding an alcohol to the mixture.

RELATED APPLICATION

The present application is a continuation-in-part of co-pending U.S. patent application Ser. No. 357,223 filed Apr. 3, 1964 by Joseph L. Russell and now abandoned.

BACKGROUND OF THE INVENTION

Processes for the liquid phase partial oxidation of hydrocarbons in the presence of a lower hydrate of boric acid are commercially utilized on a large scale. At the termination of the oxidation reaction, the reaction mixture contains a substantial amount of alcohol in the form of a borate-ester. In order to recover the alcohol as such it is desirable to subject the oxidation reaction mixture to a hydrolysis whereby the alcohol is liberated and may be recovered readily by distillation, solvent extraction, or the like. The hydrolysis is readily accomplished for example, by adding water to the oxidation reaction mixture before or after hydrocarbon removal and optionally heating e.g., at temperatures from 30° C. to 150° C. The boric acid residue may be recovered from the reaction mixture as a slurry of solid ortho-boric acid mixed with hydrocarbon and water, and preferably the ortho-boric acid is dehydrated to anhydrous meta-boric acid before re-use. Continuous azeotropic dehydration of the slurry may require a large boil-up of hydrocarbon, and there is carried over with the dehydration vapor a significant amount of boron-containing material. Boron material is also carried over in the vapors from the oxidation step. After the vapors are cooled and condensed by contacting hydrocarbon feed, water is separated therefrom and the boron-containing hydrocarbon is recycled. Before being passed to the reactor, the hydrocarbon is further heated by indirect heating. In this step, the boron-containing material may deposit on and clog heat exchange surfaces and reboilers. This requires plant shut-down and clean-out, which markedly reduces plant efficiency and results in boron losses. The art is confronted with the problem of providing an efficient reaction and dehydration process which minimizes or avoids these disadvantages.

Accordingly, it is an object of the present invention to provide a method whereby deposition on heated surfaces of boron-containing material may be avoided. Another object is to provide an improved method for vaporizing boron-containing hydrocarbon feed. These and other objects of the present invention will be apparent from the following description.

BRIEF SUMMARY OF THE INVENTION

It has now been found that the undesirable deposition of boron-containing material in a mixture of liquid hydrocarbon and a boric acid on surfaces heated by indirect means may be avoided by incorporating an alcohol in the mixture.

The alcohol may consist of aliphatic or cycloaliphatic alcohols or mixtures thereof having from about 1 to 18 carbon atoms in the molecule. As examples of such compounds there may be mentioned, for instance, methanol, ethanol, propanol, isopropanol, n-butanol, isobutanol, 2-methylbutanol, n-pentanol, 2-methylpentanol, n-hexanol, n-heptanol, 2-methylhexanol, 2-methyl heptanol, n-octanol, n-decanol, n-dodecanol, n-octadecanol, cyclopentanol, cyclohexanol, methylcyclohexanol, cycloheptanol, and the like. Polyhydric alcohols may also be used. As examples of such materials there may be mentioned ethylene glycol, propylene glycol, glycerol, pentaerythritol, di-ethylene glycol, 2,3-butylene glycol, sorbitol, mannitol and the like. The process of the present invention is particularly adapted for the oxidation of saturated aliphatic and cycloaliphatic hydrocarbons having from 4 to 8 carbon atoms, such as, for example, butane, methyl butane, pentane, cyclopentane, methylcyclopentane, cyclohexane, methylcyclohexane, cycloheptane, cyclo-octane, and the like. In a preferred embodiment of the present invention, the alcohol will have the same carbon skeleton as the hydrocarbon being oxidized. The alcohol or mixture of alcohols produced in the reaction is preferred, but any alcohol which forms a soluble boron derivative is suitable. Of course, the alcohol and its boron derivative should be resistant to chemical attack (oxidation) in the reaction system.

The quantity of alcohol is at least 0.5 equivalent of alcohol per equivalent of total boron material calculated as ortho-boric acid in the mixture of hydrocarbon and boron-containing material being indirectly heated by contacting a heated surface. While higher amounts of the alcohol may be used, a practical upper limit is about 5 equivalents of alcohol per equivalent of acid calculated as ortho-boric acid. Amounts in excess of about 5 equivalents should be avoided as these amounts tend to lower the selectivity in the oxidation step. The alcohol may be added to the hydrocarbon in the vaporizer or, it may be added to the hydrocarbon at a prior step in the process, for example, by being added to the hydrocarbon feed.

The temperature of the vaporization surface is at least 195° C. and preferably higher for efficient operation. As to higher temperatures, about 275° C. is regarded as a practical upper limit for a system at the vapor pressure of the hydrocarbon, but higher temperatures and pressures may be used.

Suitable oxidation reaction temperatures are broadly from 75° C. to 300° C., desirably from 100° C. to 200° C., and preferably from 140° C. to 180° C. Suitable dehydration temperatures are desirably 100° C. to 160° C. and preferably 140° C. to 155° C. The process is carried out continuously or batchwise. The pressure in these steps may be atmospheric or higher, e.g. up to 250 p.s.i.g. or above.

The hydrocarbon subjected to heating on a surface which is at a temperature of at least 195° C. contains 0.01 to 2.0% by weight of boron material, calculated as ortho-boric acid. This boron material is believed to contain some ortho-boric acid, but most is believed to be meta-boric acid.

In the recovery of the hydrocarbon from the reaction mixture, e.g. after hydrolysis treatment, the distillation may be conducted so as to carry over a small amount of alcohol, e.g. 0.3 to 3.0% by weight of the mixture. The amount selected is such as to meet the alcohol requirement for avoiding deposition of boron material in the step of contacting the recycled hydrocarbon with a heated surface at least 195° C. Of course, this hydrocarbon picks up ortho-boric acid and possibly some meta-boric acid from the dehydration vapors and the oxidation vapors during direct heat-exchange with these vapors prior to the heating at 195° C. or above. This heating is in an atmosphere substantially free of molecular oxygen; i.e., it is conducted under non-oxidizing conditions. Under such conditions, there is no conversion of hydrocarbon to alcohol.

DETAILED DESCRIPTION

In order to indicate still more fully the nature of the present invention, the following examples of typical procedures are set forth in which parts and percents mean parts and percents by weight, respectively, unless otherwise indicated, it being understood that these examples are presented as illustrative only and they are not intended to limit the scope of the invention.

Example 1

Referring to the drawing, oxidation reactors 10a, 10b and 10c are connected in series and each continuously receives feed from the previous reactor except for reactor 10a which receives feed from dehydrator 16. The feed to reactor 10a via line 18 contains 96 parts of cyclohexane and 4 parts of meta-boric acid. The oxidizers are maintained at a temperature of about 330° F. or 165° C., and a pressure of 125 p.s.i.g. Air diluted with nitrogen to $O_2$ concentration by volume of 10% is introduced into the reactors through lines 36, 36a, 36b and 36c. About 8% of the cyclohexane (i.e. about 8 parts) reacts as the liquid reaction mixture is passed from reactor 10a via line 33 to reactor 10b and via line 34 to reactor 10c, and is then withdrawn via line 35.

About 80 parts of the withdrawn reaction mixture is admixed with 30 parts of water and hydrolyzed at 80° C. The resulting mixture is settled and a lower aqueous boric acid phase is decanted from the upper organic phase. The aqueous phase is cooled to 10° C. by vacuum evaporation of water and crystalline ortho-boric acid is recovered by centrifugation. The ortho-boric acid crystals are slurried in cyclohexane and the slurry passed via line 17 to dehydrator 16 wherein the ortho-boric acid is dehydrated to meta-boric acid at 150° C. The resulting meta-boric acid slurry in cyclohexane is passed via line 18 to reactor 10a.

The oil or filtrate from the hydrolyzed reaction mixture is processed to recover a cyclohexanol fraction, e.g., by distillation or equivalent manner.

The hydrocarbon and water vapors at 165° C. are passed from the reactors via lines 11a, 11b, 11c and 12 to tower 13, wherein they are cooled by contact with liquid containing cyclohexane fed via line 28. The vapors then pass via line 15 to dehydrator 16. Liquid from tower 13, heated to a temperature in the range of 150° C. to 165° C., is passed via line 29 to vaporizer 30, wherein it is heated further under non-oxidizing conditions in the presence of a small amount of cyclohexanol (e.g., up to about 185° C. via steam coil 30a having its heating surface at 225° C.) and some is vaporized. The amount of cyclohexanol is 1.0 mol per equivalent of boron material calculated as ortho-boric acid in the mixture and the content of boron material calculated as ortho-boric acid is 0.1% by weight of the mixture in the vaporizer. Cyclohexane vapor is passed therefrom via lines 32, 32a, 32b and 32c to reactors 10a, 10b and 10c. Hot liquid is passed therefrom via line 31 to reactor 10a. Where desirable, some of this liquid could be passed into oxidizers 10b and 10c (connections not shown).

The cyclohexanol is included in the cyclohexane fed to the tower system; it may be added via line 29a, if desired. The alcohol may be present in the mixture fed to the vaporizer, or it may be added to the vaporizer (after fouling of the latter).

The boron material present in the cyclohexane mixture heated in vaporizer 30 is in solution and there is no deposition thereof in the vaporizer. This material is mainly ortho-boric acid but may include meta-boric acid.

The hydrocarbon and water vapor from dehydrator 16 together with some boric material is passed via line 19 to tower 20, wherein it is cooled by contact with liquid. The upper part of this tower is preferably maintained at about 100° C. to avoid condensation of water. The vapor is passed via line 21 to condenser 22, wherein it is cooled to about 40° C. and water and hydrocarbon are condensed, and passed via line 24 to separator 25. Non-condensible gas is removed via line 23. Water is separated and removed via line 26. Liquid hydrocarbon at 40° C. is passed via line 27 to tower 20.

Heat is supplied to dehydrator 16 for vaporizing water by means of hydrocarbon vapor introduced via line 15. The temperature is maintained at about 150° C. and the ortho-boric acid is dehydrated to meta-boric acid at a pressure of about 120 p.s.i.g.

The liquid from tower 20 is passed via line 28 to tower 13 and then via line 29 to vaporizer 30. The liquid in the vaporizer is substantially oxidant-free but contains boron material in an amount of 0.1 by weight calculated as ortho-boric acid; however, none is deposited in vaporizer 30, thereby preventing fouling of the vaporizer and related lines. This prevention of fouling is due to the presence of the cyclohexanol. In this way, efficient heat transfer is achieved without caking or coating on heat transfer surfaces.

Heat is introduced into reactors by means of hydrocarbon vapor supplied by lines 32, 32a, 32b, and 32c. The liquid fed to these reactors is preheated, as already mentioned. The amount of hydrocarbon vapor fed is sufficient to maintain the reaction mixture at the temperature desired, as well as provide the necessary boil-up. It also may provide heat for dehydrator 16 on start up.

In tower 20, the "wet" or "watery" hydrocarbon introduced via line 27 is heated and water is removed as vapor with some hydrocarbon (as described in U.S. Pat. 3,109,864), the vapor passed via line 21 is condensed in condenser 22 (non-condensibles removed via line 23) and the liquid is passed via line 24 to separator 25 wherein a lower water layer is separated, and removed via line 26. Dry hydrocarbon is removed from tower 20 via line 28.

Comparative Example A

The above procedure is repeated except that no cyclohexanol (solubilizer) is included in the material fed to the vaporizer. Under the analogous operating conditions, there is significant fouling of the vaporizer in relatively short time, requiring plant shut-down and clean-out. The process of the invention avoids such fouling, permitting extended efficient plant operation.

In an alternate of the invention, sufficient alcohol may be added occassionally (in the vaporizer) even after some deposit has formed (but not sufficient to block flow), in order to clear up the deposit, thereby avoiding the need of plant shut-down.

Example 2

The procedure of Example 1 is modified to run the oxidation as a batch oxidation. A charge of hydrocarbon and ortho-boric acid (containing about 20% of the acid) is dehydrated at 150° C. and 120 p.s.i.g. in dehydrator 16 by hydrocarbon vapors fed via line 32a. During the dehydration, hydrocarbon accumulates in the dehydrator giving a charge which is passed to reactor 10a (e.g. containing 96 parts of cyclohexane and 4 parts of meta-boric acid).

Hydrocarbon fed via line 14 passes to the vaporizer 30 (as described above) and it contains boron material (about 0.1% by weight of the mixture calculated as ortho-boric acid). It also contains 1.0 mol of cyclohexanol per equivalent of boron material calculated as ortho-boric acid (added in the feed to line 14, or optionally via line 29a.) There is no deposition of boron material in the vaporizer.

The reaction product mixture is removed via line 33a (reactors 10b and 10c, and lines 11b, 11c, 32b, 32c, 36b and 36c being closed off).

Comparable results to the foregoing are achieved with various modifications thereof including the following. A lower hydrate of ortho-boric acid is maintained in admixture with the reactants during the oxidation reaction. Preferred lower hydrates are meta-boric acid, tetra-boric acid, boron oxide, or mixtures thereof. By lower hydrate is meant a dehydration derivative of ortho-boric acid.

In the continuous system the proportion of fresh feed fed via the two lines (17 and 14) may be adjusted, so as to control the desired heating of the dehydration system, e.g. 50% via each line.

As to the amount of alcohol required to prevent deposition of boron material, a series of tests is made each with controlled mixtures and controlled surface temperature for 180 minutes, after which the heating surface is removed from the liquid and observed visually. The body of the liquid is at temperature in the range of 165° to 185° C., and the pressure is at or above the vapor pressure of the cyclohexane in the charge.

The following results are typical:

| Surface temp., ° C. | Inorganic boron compound percent (on wt. of mixture) calculated as ortho-boric acid | Mols of cyclohexanol per equiv. of boric acid (calculated as ortho-boric-acid) | Deposition observed |
|---|---|---|---|
| 209 | 0.5 | 0 | Yes. |
| 210 | 0.5 | 0 | Yes. |
| 190 | 0.5 | 0 | No. |
| 220 | 0.1 | 0 | Yes. |
| 220 | 0.1 | 0.34 | No. |
| 220 | 0.1 | 0.67 | No. |
| 220 | 0.2 | 0 | Yes. |
| 220 | 0.2 | 1.0 | No. |

In view of the foregoing disclosures, variations and modifications thereof will be apparent to one skilled in the art, and it is intended to include within the invention all such variations and modifications except as do not come within the scope of the appended claims.

What is claimed is:

1. In a process for oxidizing a member selected from the group consisting of saturated aliphatic hydrocarbons and saturated cycloaliphatic hydrocarbons in the presence of a boron compound wherein a borate ester is formed, and wherein said hydrocarbon admixed with boric material is vaporized under non-oxidizing conditions before being passed to the reactor, the improvement of preventing deposition of boron-containing material on heated surfaces used to vaporize said hydrocarbon which comprises vaporizing said hydrocarbon by contacting it with an indirect heating surface at a temperature of at least 195° C. in the presence of a saturated unsubstituted alcohol.

2. A process according to claim 1 wherein the alcohol is present in an amount of from about 0.5 to about 5.0 equivalents per equivalent of boric material in the hydrocarbon feed calculated as ortho-boric acid.

3. A process according to claim 1 wherein the alcohol has the same carbon skeleton as the hydrocarbon.

4. A process according to claim 1 wherein the alcohol is added to the hydrocarbon in the vaporizing step.

5. A process according to claim 1 wherein the alcohol is added to the hydrocarbon feed.

6. A process according to claim 1 wherein the hydrocarbon is a cycloalkane.

7. A process according to claim 6 wherein the cycloalkane is cyclohexane.

8. A process according to claim 6 wherein the alcohol is a cycloalkanol.

9. A process according to claim 8 wherein the alcohol is cyclohexanol.

10. A process according to claim 2 wherein the hydrocarbon is cyclohexane and the alcohol is cyclohexanol.

References Cited

UNITED STATES PATENTS

| | | | |
|---|---|---|---|
| 2,396,938 | 3/1946 | Bersworth | 210—58 |
| 2,589,195 | 3/1952 | Monson | 210—58 |
| 3,275,695 | 9/1966 | Marcell. | |
| 3,317,581 | 5/1967 | Becker. | |
| 3,317,614 | 5/1967 | Marcell. | |
| 3,350,465 | 10/1967 | Steeman et al. | |

LEON ZITVER, Primary Examiner

JOSEPH E. EVANS, Assistant Examiner

U.S. Cl. X.R.

210—58; 260—617, 631, 639